US006652417B2

United States Patent

Iriyama

(10) Patent No.: US 6,652,417 B2
(45) Date of Patent: Nov. 25, 2003

(54) ENGINE CONTROLLING APPARATUS AND METHOD FOR A CAR

(75) Inventor: Masahiro Iriyama, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/024,277

(22) Filed: Dec. 21, 2001

(65) Prior Publication Data

US 2002/0098944 A1 Jul. 25, 2002

(30) Foreign Application Priority Data

Dec. 22, 2000 (JP) ....................................... 2000-391163

(51) Int. Cl.[7] ................................................ B60K 41/04

(52) U.S. Cl. ......................... 477/111; 701/54; 701/102; 701/110

(58) Field of Search ............................ 477/111; 701/54, 701/102, 110

(56) References Cited

U.S. PATENT DOCUMENTS 4,401,073 A * 8/1983 Furuhashi ................... 123/320
4,515,040 A * 5/1985 Takeuchi et al. .............. 477/43
4,879,982 A * 11/1989 Itakura et al. .............. 477/111
5,040,114 A * 8/1991 Ishikawa et al. .............. 701/54
5,389,051 A * 2/1995 Hirate et al. ................ 477/111
5,580,331 A * 12/1996 Shiraishi et al. ............ 477/109
5,899,830 A * 5/1999 Tabata ........................ 477/111
6,027,425 A * 2/2000 Sakaguchi et al. ............ 477/48
6,330,504 B1 * 12/2001 Toukura et al. ............... 701/54

FOREIGN PATENT DOCUMENTS

JP 9-228867 9/1997

* cited by examiner

*Primary Examiner*—Rodney H. Bonck
*Assistant Examiner*—David D. Le
(74) *Attorney, Agent, or Firm*—Foley & Lardner

(57) ABSTRACT

An engine output is controlled by controlling an electronically controlled throttle valve based upon an objective engine torque that is set by referring to an engine torque map having data of an accelerator opening degree and an engine rotating speed. A torque correction rate of the objective engine torque is calculated by a surface interpolation with each direction interpolation of a speed change ratio for a transmission and the engine rotating speed based upon a map having the speed change ratio and the engine rotating speed as lattice axes. The objective engine torque is corrected corresponding to the torque correction rate thereof.

8 Claims, 5 Drawing Sheets

FIG.3

SPEED CHANGE RATIO

| ENGINE ROTATING SPEED [rpm] | 3.55 (1st) | 2.55 (2nd) | 1.47 (3rd) | 1 (4th) | 0.84 (5th) |
|---|---|---|---|---|---|
| 8000 | 105 | 120 | 120 | 115 | 100 |
| 5000 | 105 | 120 | 120 | 115 | 100 |
| 4000 | 105 | 120 | 120 | 115 | 100 |
| 3600 | 105 | 120 | 115 | 115 | 100 |
| 3200 | 105 | 120 | 115 | 115 | 100 |
| 2800 | 105 | 110 | 108 | 115 | 100 |
| 2400 | 100 | 100 | 105 | 105 | 100 |
| 2000 | 100 | 100 | 100 | 100 | 100 |

ENGINE ROTATING SPEED [rpm]

TORQUE CORRECTION RATE [%]

ENGINE CONTROLLING APPARATUS AND METHOD FOR A CAR

BACKGROUND OF THE INVENTION

1. Field of the Invention

The present invention relates to an engine controlling apparatus and method for a car employing an electronically controlled throttle valve.

2. Background Information

One engine controlling apparatus is constituted so as to set an objective throttle opening degree by reference to a characteristic table indicating a relationship between the accelerator opening degree and the throttle valve opening degree, on the basis of detection of a present accelerator opening degree. The other engine controlling apparatus is disclosed in Laid-open Japanese Patent Publication No. 9-228867, which is constituted so as to control setting of an objective opening degree of the throttle valve by firstly calculating an objective engine torque on the basis of detection of a present, accelerator opening degree and by subsequently using the calculated objective engine torque to determine an opening degree of the throttle valve from the characteristic map of the throttle valve opening degree, in which map an objective engine torque and an engine rotating speed are parameters.

Moreover, either when the above-mentioned throttle valve opening degree characteristic map is set in the former case or when the calculation of the objective engine torque is carried out on the basis of the present opening degree of the accelerator in the latter case, it is possible to pay an additional consideration to a power performance of the engine, as required.

SUMMARY OF THE INVENTION

With regard to the subject of a power performance and an accelerating feeling of an engine-operated car, if a car driver is able to have a feeling of a rise in an output torque and an engine power in response to an increase in the car speed and the engine rotating speed, he will surely be able to perceive that the car is powerful. More concretely, for example, if each of the two driving conditions is satisfied, an engine can be considered as being sufficiently powerful. Namely, in the first one, when the car is started and shifted up to accelerate the car, even if the rotating speed of the engine drops down for a while due to the shifting up, when the driver can thereafter have a feeling of a rise in the output torque and power of the engine in response to an increase in car speed and engine rotating speed, he will be able to have the feeling of powerfulness on the engine.

In the other condition, during running at a constant speed on a road, i.e., during running on a 0% inclination road, when the accelerator pedal is pressed down and a shifting down is conducted so as to increase the engine rotating speed. If a rise in the output torque of the engine occurs in response to an increase in the engine rotating speed and the car speed, the car will surely provide a driver with the feeling of powerfulness of the engine.

Nevertheless, in the art of electronically controlling of the engine by using a micro-computing unit, e.g., a central processing unit (a CPU), on the basis of only the characteristic table between an opening degree of an accelerator and that of a throttle valve, an increase in a rotating speed of the engine cannot be further incorporated into the controlling factors, and accordingly it is impossible to produce and incorporate the above-mentioned feeling of the output torque of the engine in a controlling program for controlling the engine.

In addition, there is a non-linear relationship between the opening degree characteristic of a throttle valve and the output torque characteristic of the engine, that is, while the opening degree of the throttle valve is becoming large, an increase in the output torque comes to a saturation. Also, the above two characteristics change in response to a change in the engine rotating speed. Therefore, it is quite difficult to produce these characteristics in a controlling program for obtaining a desired power performance of a car. In other word, it is impossible to produce a linear rise in the output torque and power of the engine in a controlling program for controlling the engine.

Therefore, a primary object of the present invention is to provide a novel technical concept, which when an assumption is made that an output power of the engine is controlled by adjustably regulating a position of an electronically controlled throttle valve based on a set value of an objective engine output torque, allows to produce a controlling program including a rise in an output torque of the engine in response to an increase in the car speed and the engine rotating speed, by effectively correcting the set value of the objective engine output torque.

To this end, the present invention was made to adopt a constitution in which when an objective torque of a car engine is set to adjustably regulate an electronically controlled throttle valve to thereby control an output power of the engine, an amount of correction to be provided to an objective torque of the engine is calculated by performing a surface interpolation on a map in which the lattice axes are formed by a speed change ratio of a transmission and a rotating speed of a car engine, in respective directions of the axes of the speed change ratio and the rotating speed of the engine, and the calculated amount of correction is used for correcting the objective torque of the engine.

BRIEF DESCRIPTION OF THE DRAWINGS

FIG. 3 is a schematic view illustrating a concrete example of a control map indicating a correction rate of an output torque of an engine;

DETAILED DESCRIPTION OF THE PREFERRED EMBODIMENTS

Figure 1:
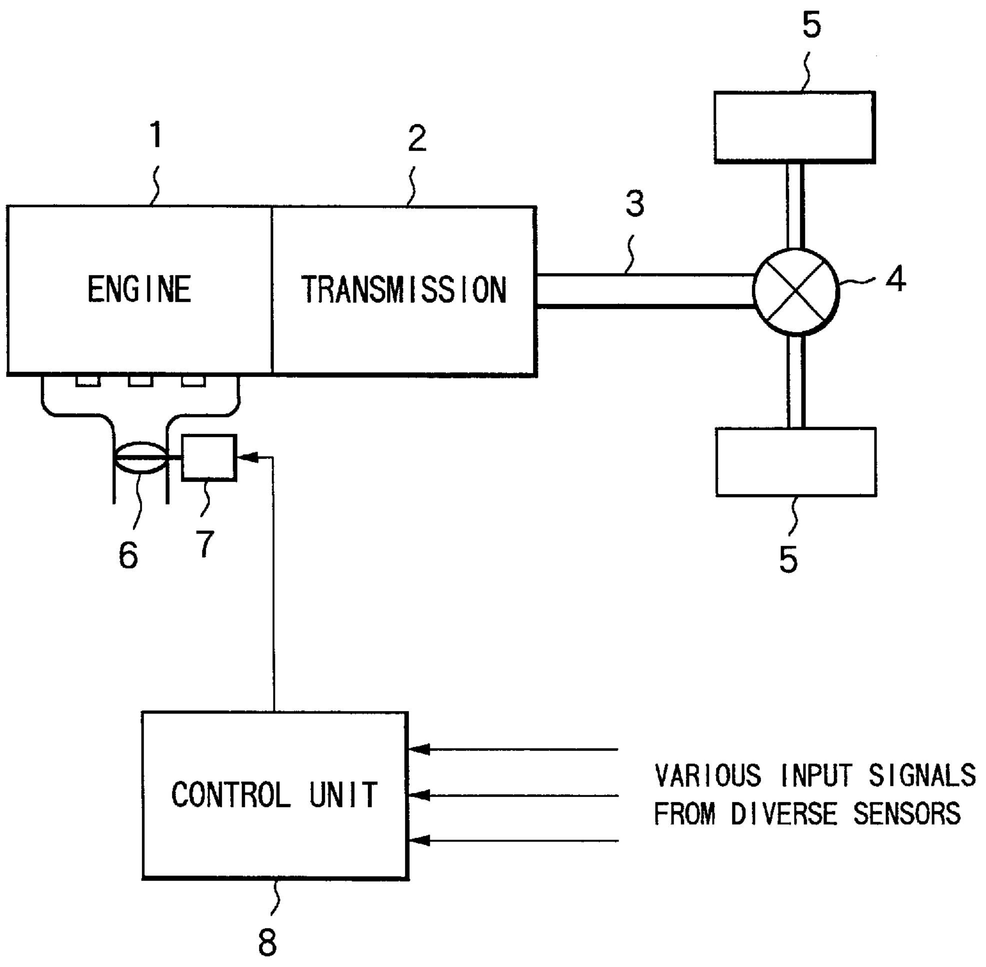
FIG. 1 is a schematically diagrammatic view illustrating a car drive system to which an embodiment of the present invention is applied.

Referring to FIG. 1, an engine 1 has an output shaft (a crank shaft), which is connected to a transmission 2 (an automatic transmission or a manual transmission). The transmission 2 has an output shaft 3, which drives drive wheels 5, 5 via a final gear assembly 4.

An intake system of the engine I is provided with an electronically controlled throttle valve 6 having a drive motor 7 thereof that is controlled by a control unit 8. The control unit 8 is arranged so as to receive at its inputs various signals from diverse kinds of sensor units such as an accelerator opening degree sensor, a crank angle sensor and so on, and delivers an output signal for controlling an opening degree of the electronically controlled throttle valve 6 on the basis of the received input signals.

Figure 2:
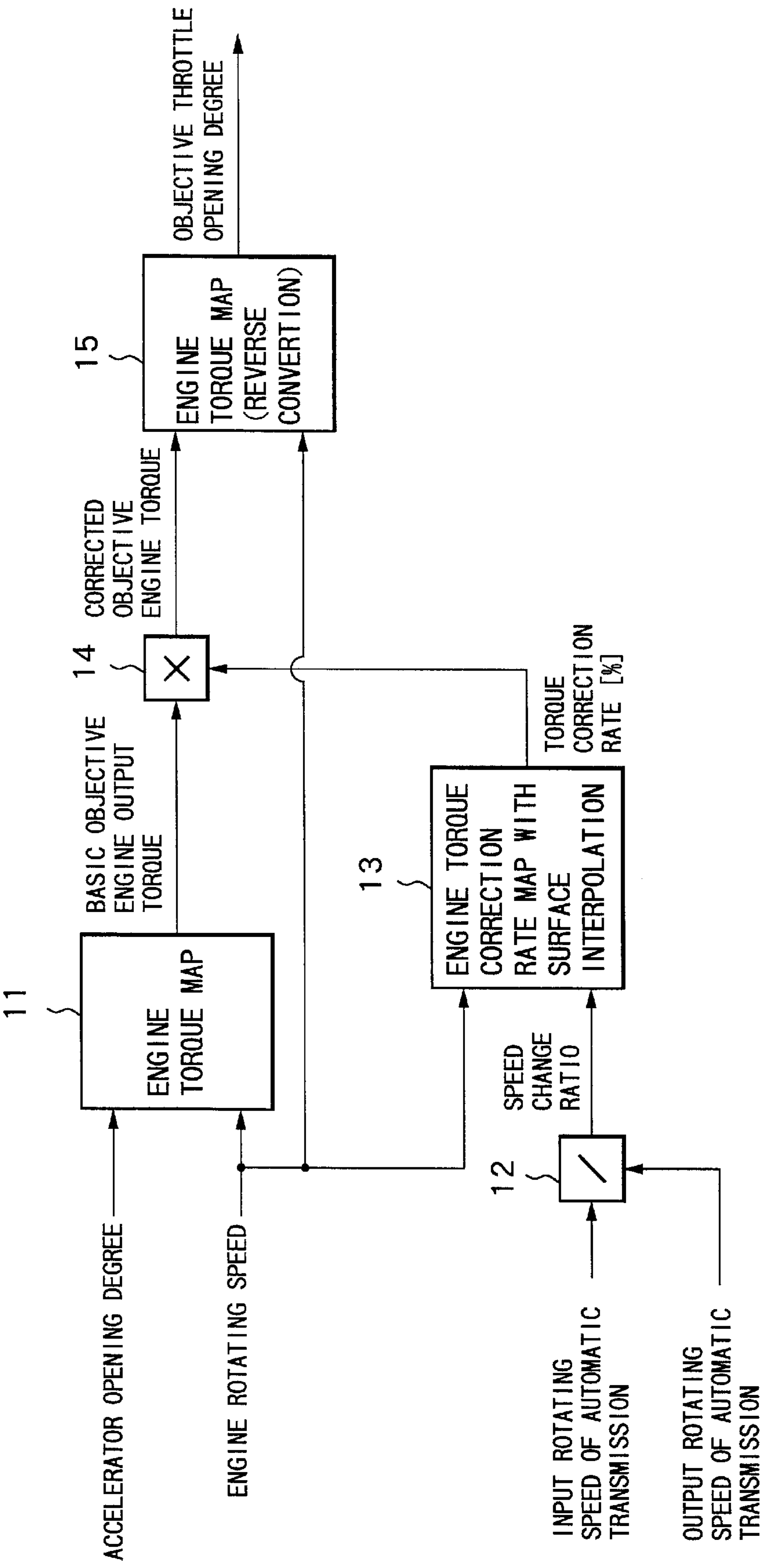
FIG. 2 is a block diagram illustrating a controlling system for controlling an opening degree of an electronically controlled throttle valve.
Figures 4A, 4B, 4C, 4D:
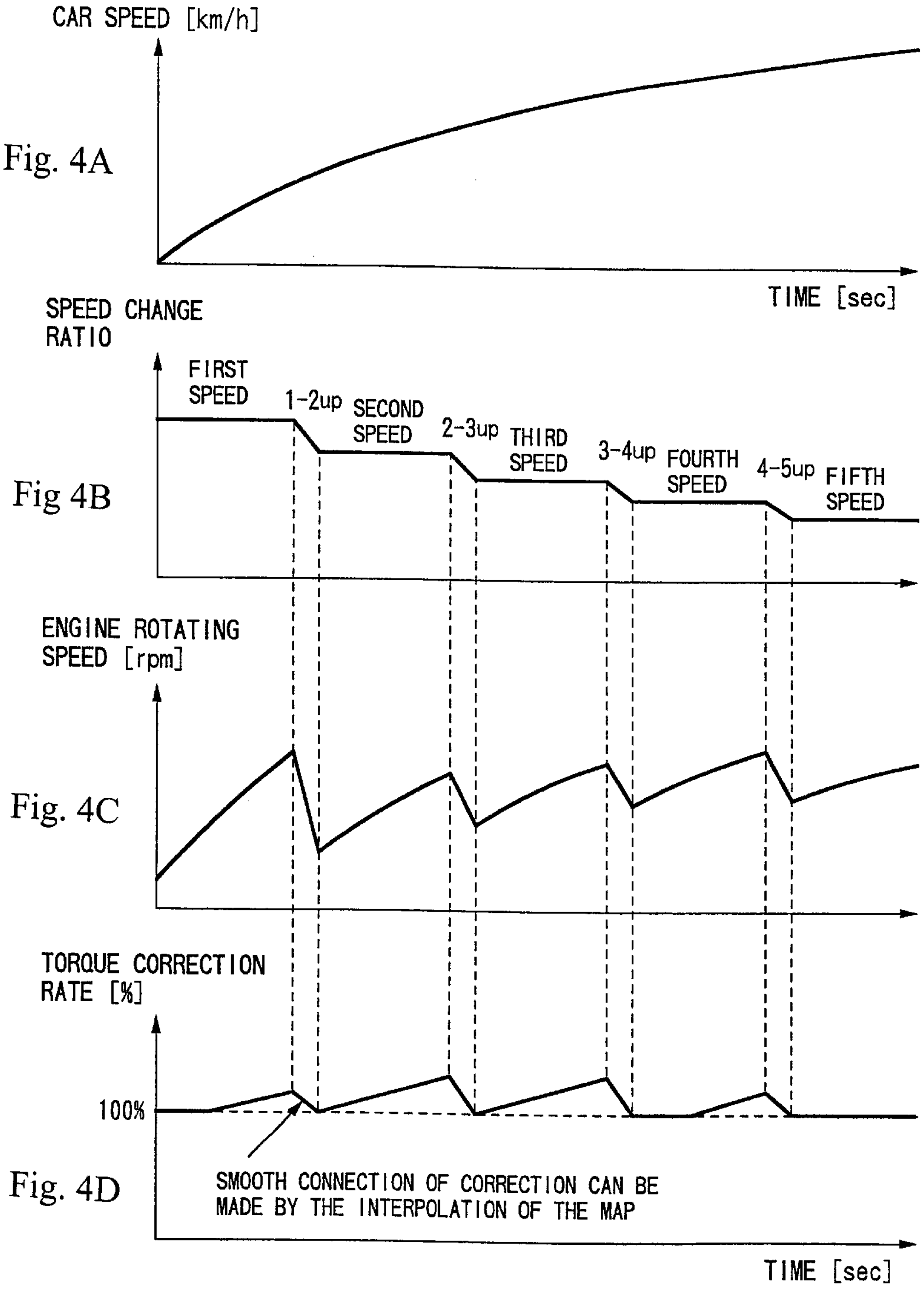
FIGS. 4*a* through 4*d* are time charts at the time of starting and accelerating a car, with the ordinates indicating a car speeds a speed change ratio, a rotating speed of an engine (an engine rotating speed), and a torque correction rate, respectively, and the abscissa indicating a time lapse.

Referring now to FIG. 2, illustrating a controlling system provided in the control unit 8 for controlling the electronically controlled throttle valve 6, there is provided a basic objective engine torque setting unit 11, which is provided with an engine torque controlling map in which an opening degree of an accelerator and a rotating speed of the engine are parameters. Thus, when the basic objective engine torque setting unit 11 receives the input signals of opening degree [deg.] of the accelerator detected by the accelerator opening degree sensor and rotating speed [r.p.m.] of the engine detected by the crank angle sensor, the unit 11 delivers an output to set a basic objective engine torque [Nm] by referring the controlling map.

A speed change ratio calculating unit 12 of the control unit 8 is provided to calculate a speed change ratio. Namely, when the transmission 2 is formed by an automatic transmission (it is referred to as merely "AT"), a speed change ratio (=an AT input rotating speed [r.p.m.]/an AT output rotating speed [r.p.m.]) is calculated by the AT input rotating speed detected by an AT input rotating speed sensor and the AT output rotating speed detected by an AT output rotating speed sensor.

On the other hand, when the transmission 2 is formed by a manual transmission (it is referred to as merely "MT"), the control system is provided with neither the input rotating speed sensor nor the output rotating speed sensor. Thus, a speed change ratio is calculated by an equation set forth below.

A speed change rate=K×an engine rotating speed [r.p.m.]/a car speed [Km/h]

where K is a constant and is defined below.

$K$=a final gear ratio×(2π×a radius of a tire [m])×1000/60

An engine torque correction amount (correction rate) calculating unit 13 of the control unit 8 is provided for setting an engine torque correction rate [%] by the process as follows. Namely, the engine torque correction amount calculating unit 13 is provided therein with a control map of an engine torque correction rate, of which the parameters are a speed change ratio and an engine rotating speed, and this control map of engine torque correction rate has a function of surface interpolation. Therefore, when the data of the speed change ratio and the engine rotating speed are given to the input of the calculating unit 13, reference is made to the control map of engine torque correction rate, and then after a surface interpolation (an interpolation for each of the speed change ratio and the engine rotating speed) is implemented, a required engine torque correction rate [%] is set and delivered from the output of the calculating unit 13. At this stage, it should be understood that FIG. 3 indicates the above-mentioned control map of engine torque correction rate provided in the calculating unit 13 and is used for an example case where the transmission 2 Is either a five-speed automatic transmission or a five-speed manual transmission.

For example, when the transmission is being shifted from, for example, the second to third speed at 2,500 [r.p.m.] of engine rotating speed and 2.01 of speed change ratio, a surface interpolation is carried out to obtain a torque correction rate, by using the data of four lattice points in FIG. 3, defined by 2,800 and 2,400 [r.p.m.] of engine rotating speed and 2.55 and 1.47 of speed change ratio. Similarly, when a speed change ratio is at 1.47 (the third seed), a torque correction rate of 105.75 can be obtained by internally dividing a difference between the two lattice points of a torque correction rate of 105 at 2,400 [r.p.m.] and a torque correction ratio of 108 at 2,800 [r.p.m.] with the ratio of 1 to 3. Also, since the speed change ratio of 2.01 is a value obtained by internally dividing a difference between the speed change ratio of 2.55, (the second speed) and that of 1.47 (the third speed) with the ratio of 1 to 1, a torque correction rate of 104 can be obtained by internally dividing a difference between the above obtained values of 102.5 and 105.75 with the ratio of 1 to 1. At this stage, it should be understood that except for the case where the shifting operation is being taken place by a car driver, a speed change ratio is defined on each of the five lattice axes of FIG. 3, and accordingly any interpolation calculation for obtaining a torque correction rate may be implemented only in a direction along the axis of engine rotating speed.

An objective engine torque correcting unit 14 of the control unit 8 is provided for calculating an corrected objective engine torque [Nm] from a basic objective engine torque[Nm] by an multiplying the latter with the above-mentioned torque correction rate [%]. Namely, the calculation is implemented by the following equation, i.e., the corrected objective engine torque [Nm]=the basic objective engine torque [Nm]×the above-mentioned torque correction rate [%]/100.

An objective throttle opening degree calculating unit 15 of the control unit 8 is provided for calculating an objective opening degree [deg] of the electronically controlled throttle valve 6, and in turn an objective-opening degree [deg] of an accelerator. Namely, the objective throttle opening degree calculating unit 15 is provided therein with an engine torque map in which the parameters are the opening degree of the accelerator (=the opening degree of the throttle valve) that was used in the afore-described basic objective engine torque setting unit 11 and the engine rotating speed. Thus, when the data of the engine torque, i.e., the corrected objective engine torque [Nm] and the engine rotating speed are inputted as shown in FIG. 2, the data of the objective opening of the throttle valve [deg], and in turn the objective opening degree [deg] of the accelerator are calculated by inversely reading the engine torque map.

Of course, the engine torque map of the objective throttle opening degree calculating unit 15 may alternatively be replaced with a different map that is identical in its characteristic with the engine torque map used by the above-described the basic objective engine torque setting unit 11. In that case, a map of throttle opening degree in which the parameters are the objective engine torque and the engine rotating speed may be provided in the objective throttle opening degree calculating unit 15, and when the data of the corrected engine torque and the engine rotating speed are given, the map of throttle opening degree will be referred to for obtaining the objective opening degree of the electronically controlled throttle valve 6. Thus, the obtained objective opening degree [deg] of the throttle valve 6 is delivered as a command for setting and controlling the electronically controlled throttle valve 6.

As will be understood from the foregoing description, when the correction is made to the engine torque, any non-linearity of the engine torque (at every engine rotating speed) against the opening degree of the throttle valve can be removed, and a feeling of a linear rise in the engine torque may be easily produced as an optically perceptible torque characteristic control table or map, and may be easily complied with. Further, the number of points of data required in the direction of the engine rotating speed may be as small as possible for producing a control table or map realizing a linear rise in the engine output torque.

In the torque correction by an amplified rate (i.e., a rate is always equal to or larger than 100%), as employed in the present embodiment, the rate of 100% means no correction. Thus, when the torque correction rate employed is excessively large, all of the output power of a car engine must be exerted as required, and as a result, even if a driver presses the accelerator pedal, any rise in the engine output toque may not occur. In other words, a dead zone might appear in the engine output torque in relation to the opening degree of the accelerator. Therefore, in order to avoid appearing of such dead zone in the engine output torque, the map of torque correction rate shown in FIG. 3 employs 120% as its uppermost correction rate. Further, in the starting and accelerating stage of a car where a car driver may most sensitively feel the power performance exerted by the car, it is very important to produce a definite rise in the engine output torque when the transmission is shifted to the second or third speed, and therefore the values of torque correction rate at the second and third speeds in the map of FIG. 3 are set to be larger than the other speed positions.

FIGS. 4*a* through 4*d* indicate various time charts in the above-mentioned starting and accelerating stage of the car.

Even if the engine control system employs any of the automatic transmission and the manual transmission as the transmission 2 (FIG. 1), a change in a speed change ratio gradually occurs for a changing time ranging from 500 ms to 1,000 ms when an actual shifting operation is performed by a car driver. Therefore, in the present invention, an employment of a torque correction rate control map with a surface interpolation, in which one of the parameters is a speed change ratio that is analogue value and is not a speed change position that is a digital value, makes it possible to smoothen a change in the engine output torque due to a gradual change in the torque correction rate by the use of the surface interpolation even during the shifting operation. More specifically, any stepwise change in the engine output torque does not occur, and accordingly the changing of the engine output torque can be prevented from giving any abnormal feeling to a car driver.

Figure 5:
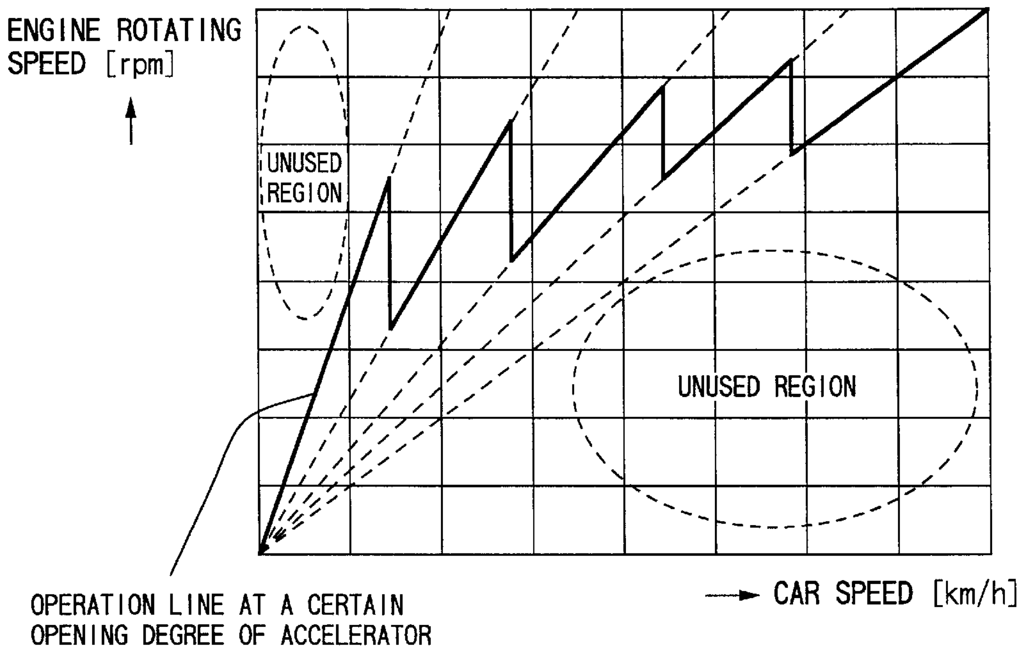
FIG. 5 is a graphical view explaining an operating condition of an engine with parameters indicating a car speed and an engine rotating speed.

Since the speed change ratio of a car can be represented by the car speed and the rotating speed of the engine, the map of torque correction rate in which the lattice axes are the speed change ratio and the engine rotating speed as shown in FIG. 3 may be replaced with an identical torque correction rate map in which the lattice axes are the car speed and the engine rotating speed as, shown in FIG. 5, as required. However, in this case, under the normal, accelerating condition of the car, except for the time of speed changing operation, each of motion lines shown in FIG. 5 moves obliquely across the map. Therefore, even if the map with the function of surface interpolation is used, an interpolation region encircled by four lattice points moves, and therefore a change in an accuracy of the interpolation occurs to result in causing the torque correction rate to be changed up and down.

Further, the respective motion lines corresponding to respective speed positions (five speed positions) extend radially from the origin point of the map as is clearly shown in FIG. 5. This fact means that when the engine rotating speed is in a low speed range, the respective motions lines comes close to one another so that the motion lines might lie in a region of an identical lattice point. Accordingly, it becomes difficult to provide various different motion feelings for every gear position. Thus, in order to improve the accuracy of the map, the number of lattice points of the map must be increased so that a lot of data must be taken in by the map.

Furthermore, it will be understood that since the motions lines of the map of FIG. 5 extend radially, unused regions of lattice point such as a left upper portion of the map (a region of low car speed and high engine rotating speed) and a right lower portion of the map (a region of high car speed and a low engine rotating speed), which are never referred to during controlling of an engine necessarily appear, and accordingly, as described above, if the number of lattice points of the map is increased so as to improve the accuracy of the map, the number of data in the unused regions of lattice point will increase, so that the map cannot be effectively used.

Figure 6:
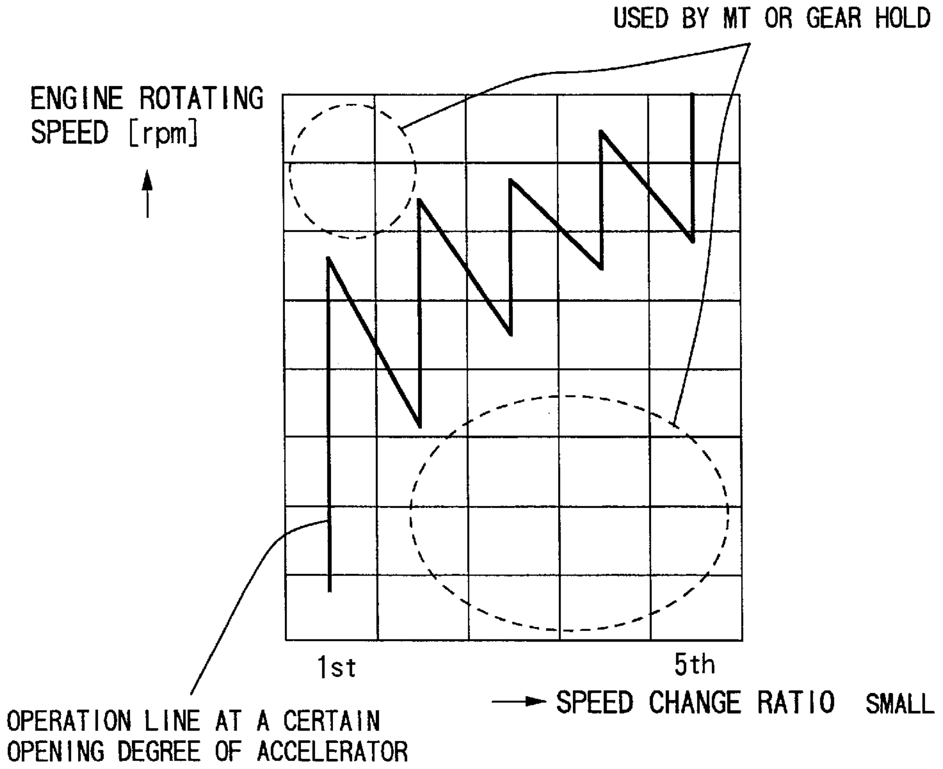
FIG. 6 is a similar graphical view explaining an operating condition of an engine with parameters indicating a speed change ratio and an engine rotating speed.

On the contrary, in the torque correction rate map having the lattice axes of speed change ratio and engine rotating speed, which is used in the present invention, normal motion lines moves in a direction along the axis of the engine rotating speed (in a vertical direction) as shown in FIG. 6, and moves obliquely only during the speed changing operation. An interpolation is implemented substantially for the data in a direction along the axis of engine rotating speed without being affected by the data in a direction along the axis of speed change ratio. Thus, an accuracy of the interpolation is not reduced even if the map takes in a small number of data. Further, since the number of lattice points in the direction along the axis of speed change ratio is not needed to be more than the number of speeds that the transmission may change. Namely, in the case of the four-speed transmission, four lattice points are sufficient, and in the case of five-speed transmission, five lattice points are sufficient. This fact means that the torque correction rate map can be very compact rendering the controlling system for the engine compact without sacrificing the performance of the controlling system.

Furthermore, in each of the manual and automatic transmissions, when the transmission is at either a gear-holding condition or a manual mode, the map must be always referred to in all of the regions in the axis of engine rotating speed with respect to each of the speed change ratio, and accordingly there is no unused data portion in the map. Thus, the map per se can be very effective and useful.

In addition, as described hereinbefore, with regard to an automatic transmission including a continuously variable transmission, the speed change ratio can be obtained by the following equation, i.e., the speed change ratio=an input rotating speed to the transmission [r.p.m.]/an output rotating speed from the transmission [r.p.m.]. Also, with regard to a manual transmission, the speed change ratio can be obtained by the following equation, i.e., the speed change ratio=K (constant)×an engine rotating speed [r.p.m.]/a car speed [Km/h]. Thus, an identical constitution of the torque correction rate map can be equally applicable to both types of the transmission without any anxiety.

In the described embodiment, as the simplest constitution, a basic objective engine torque is set by the use of an engine torque map having the parameters of accelerator opening degree and an engine rotating speed, i.e., a map wherein the entire performance of a car engine is transformed in a map. Further, an objective throttle opening degree for the electronically controlled throttle valve is obtained from the corrected objective engine torque by the employment of the same engine torque map due to an application of the reverse conversion method. However, as required, the setting of a basic objective engine torque may be effected by a more complicated constitution such as a controlling of a demand for an engine drive power. Also, the calculation of the objective opening degree of the throttle valve from the corrected objective may be implemented by the use of a more complicated constitution, which employs a physical model of the engine.

As described in the foregoing, according to the present invention, calculation of an amount of correction to be given to an objective engine output torque is implemented by the utilization of an engine torque map formed by the lattice axes of the speed change ratio of a transmission and the engine rotating speed of a car engine, and having the function of a surface interpolation in order to correct the objective output engine torque, and controlling of the opening degree of the electronically controlled throttle valve is performed on the basis of the corrected objective output engine torque. Thus, many advantageous effects as described hereinbelow can be acquired.

(1) A desired rise in an engine output torque in response to an increase in the engine rotating speed can be produced at any of the speed change positions irrespective of which speed position the transmission is shifted to.

(2) Any sudden change in the torque correction rate does not occur during the speed changing operation, and therefore smoothness in the correction to the objective engine output torque can be acquired.

(3) A highly effective correction to the engine output torque can be achieved by the employment of rather small amount of data.

(4) Since a correction is made to the engine output torque, the correction can be easily produced to be linear.

(5) The engine controlling technique according to the present invention may be equally applied to the engine no matter which the engine is connected to an automatic transmission or a manual transmission (AT or MT). Further, although the engine controlling technique according to the present invention may advantageously be applied to a case where the transmission is formed by a stepwise variable transmission, it might also be applied to a case where the transmission is formed by a continuously variable transmission (a CVT).

Furthermore, since the present invention employs a method in which the amount of correction made to an objective engine output torque is set by a rate of amplification (%) for the objective engine output torque, the advantages as set forth below are acquired.

(1) No matter whether the opening degree of the accelerator is small (a small output power) or large (a large output power), an identical rate of correction (a rate of amplification) to the engine output torque can be acquired.

(2) Since it is possible to set a torque correction rate equal to less than 100% (no correction), for example, when the correction rate in a starting region of a car (a region in which the transmission is shifted to a low speed gear and rotated at a low speed) is set below 100%, the opening degree of the throttle valve compared with that of the accelerator can be kept small so as to produce a smooth operation performance of the accelerator.

Nevertheless, an amount of correction made to an objective engine torque may be set by a rate of amplification for the objective engine output torque, and instead of multiplying the rate of amplification to the objective engine torque, the amount of correction torque per se may be obtained to thereby add the amount of torque correction to the objective engine output torque. When the method of addition is employed, an identical amount of correction torque may be added to the objective engine output torque no matter which the opening degree of the accelerator is small (a small output power) or large (a large output power).

It should be noted that there are several other methods of producing a rise in the output torque and power of an engine-operated car in response to an increase in the car speed and the engine rotating speed. These methods can be as follows.

(a) A first method is to preliminarily set a plurality of characteristic tables between the opening degree of an accelerator and that of an electronically controlled throttle valve for every position of a plurality of speed change positions, and to change over from one to the other characteristic table upon shifting the speed change position.

(b) A second method is to convert the characteristic table between the opening degree of an accelerator and that of an electronically controlled throttle valve to a map in a direction of the car speed.

(c) A third method is to convert the characteristic table between the opening degree of an accelerator and that of an electronically controlled throttle valve to a map in a direction of the engine rotating speed.

Nevertheless, with the above method (a), although the characteristic might be changed for every speed change position, it is impossible to produce the afore-mentioned rise in the output torque in response to an increase in the car speed and the engine rotating speed. Further, the changing over of the characteristic table from one to the other occurs in response to a change in the speed change position that is a digital value, and therefore a stepwise change in the output power of the engine must occur during the operation for changing the speed change operation to result in worsening the feeling of the change in the output torque. Accordingly, in order to remove the stepwise change in the output power of the engine, an additional logic for causing a movement of the characteristic tables in a direction of time is needed.

With the above method (b), even if the characteristic of the opening degree of the throttle valve is strengthened in response to an increase in the car speed to provide a feeling of a rise in the output torque, a plurality of speed change ratios can occur for a given car speed. Especially, the speed change ratio can be unfixed in a case of a manual transmission (a MT), and in an automatic transmission (an AT), there appears a hysteresis of the speed change ratio between the shifting up and down operations. Also, there is a manual mode in the case of the AT. Thus, the engine rotating speed changes depending on a difference in a speed change ratio and as a result, there appears a small difference in the characteristic of the engine output power to thereby make it impossible to surely obtain a desired correction of the objective engine output torque.

With the above method (c), even if the characteristic of the opening degree of the throttle valve is strengthened in response to an increase in the engine rotating speed to provide a feeling of a rise in the output torque, when the car is started and shifted up for acceleration, the range of an engine rotating speed that is used differs for every speed change position, and accordingly like the above method, there appears a small difference in the characteristic of the engine output power to thereby make it impossible to surely obtain a desired correction of the objective engine output torque. For example, immediately after the shifting up from 1st to 2nd, the engine rotating speed is approximately at 2,000 [r.p.m.] and therefore if a rise in torque correction is produced from 2,000 r.p.m. to 3,000 [r.p.m.], immediately after the shifting up from 2nd to 3rd, the engine rotating speed begins from 2,500 [r.p.m.]. Thus, such a problem occurs that a half of torque correction is immediately provided to thereby result in loosing a remaining part of a rise in the torque correction.

Taking into consideration each of the above methods (a) through (c), it may possible to consider a combination of the two or all of the three methods. Nevertheless, in such case, the torque correction rate map must be a three-dimensional map (three orthogonal lattice axes) or four-dimensional map (four orthogonal lattice axes). Accordingly, such map cannot be brought into a practical use from the viewpoint of logical design and data applicability. Therefore, the above-mentioned three methods will not endure to bring them into an practical and industrial use. As a conclusion, the present invention is best.

The entire contents of the basic Japanese Patent Application No. 2000-391163 filed on Dec. 22, 2000 of which the priority is claimed are herein incorporated by reference.

While only selected embodiments and their modifications have been chosen to describe and illustrate the present invention, it will be apparent to a person skilled in the art from this disclosure that various changes and variations will occur without departing from the scope of the invention as claimed in the accompanied claims. Furthermore, the foregoing description of the embodiments according to the present invention are provided for illustration purpose only, and not for the purpose of limiting the invention as claimed in the accompanied claims ands their equivalents.

What is claimed is:

1. An engine controlling apparatus for a car having a transmission, the engine controlling apparatus comprising:

- a controlled throttle valve capable of controlling an engine torque;
- an accelerator opening degree determiner to determine an accelerator opening degree;
- an engine rotating speed determiner to determine an engine rotating speed; and
- a control unit controlling the controlled throttle valve;

wherein the control unit:

- sets an objective engine output torque responsive to the accelerator opening degree and the engine rotating speed;
- determines a correct rate of the objective engine output torque based on a speed change ratio of the transmission and the engine rotating speed;
- calculates an amount of correction for the objective engine output torque by an amplifying rate responsive to the speed change ratio of the transmission and the engine rotating speed;
- corrects the objective engine output torque with the calculated correct rate; and
- controls the controlled throttle valve on the basis of the corrected objective engine output torque.

2. The engine controlling apparatus according to claim 1, wherein the calculation of the correct rate implemented by the control unit comprises setting the amplifying rate relative to the set objective engine output torque.

3. The engine controlling apparatus according to claim 2, wherein the amplifying rate to be employed for setting the correction is in a range from 100 through 120%.

4. The engine controlling apparatus according to claim 1, further comprising a control map that is set so that the correct rate at second and third speed change positions is larger than that at speed change positions other than the second and the third speed change positions.

5. The engine controlling apparatus according to claim 1, wherein the setting of the objective engine output torque implemented by the control unit comprises referring to a map of an engine output torque on the basis of data of the accelerator opening degree of the car and the engine rotating speed.

6. The engine controlling apparatus according to claim 5, wherein during controlling the controlled throttle valve on the basis of the corrected objective engine output torque, the control unit:

- obtains the accelerator opening degree for the corrected objective engine output torque from the corrected objective engine output torque and the engine rotating speed by the employment of a same characteristic map of the engine output torque that is employed for the setting of the objective engine output torque;
- converts the obtained accelerator opening degree into an objective opening degree of the electronically controlled throttle valve; and
- controls the electronically controlled throttle valve according to the converted objective opening degree thereof.

7. An engine controlling apparatus for a car having a transmission, the engine controlling apparatus comprising:

- means for determining an accelerator opening degree;
- means for determining an engine rotating speed;
- means for setting an objective engine output torque responsive to the accelerator opening degree and the engine rotating speed;
- means for determining a correct rate of the objective engine output torque based on a speed change ratio of the transmission and the engine rotating speed;
- means for calculating an amount of correction for the objective engine output torque by an amplifying rate responsive to the speed change ratio of the transmission and the engine rotating speed;
- means for correcting the objective engine output torque with the calculated correct rate; and
- means for controlling a controlled throttle valve on the basis of the corrected objective engine output torque.

8. An engine controlling method for an engine having a transmission, the engine controlling method comprising:

- determining an accelerator opening degree;
- determining an engine rotating speed;
- setting an objective engine output torque responsive to the accelerator opening degree and the engine rotating speed;
- determining a correct rate of the objective engine output torque based on a speed change ratio of the transmission and the engine rotating speed;
- calculating an amount of correction for the objective engine output torque by an amplifying rate responsive to the speed change ratio of the transmission and the engine rotating speed;
- correcting the objective engine output torque with the calculated correct rate; and
- controlling a controlled throttle valve on the basis of the corrected objective engine output torque.

* * * * *